United States Patent Office 3,503,731
Patented Mar. 31, 1970

3,503,731
HERBICIDAL 2-(ω,ω-DIETHYLENEOXYURAMIDO) BENZOATE COMPOUNDS AND METHODS
Don L. Hunter, Anaheim, Kiyoshi Kitasaki, Garden Grove, and Cecil W. LeFevre, Anaheim, Calif., assignors to United States Borax & Chemical Corporation, Los Angeles, Calif., a corporation of Nevada
No Drawing. Original application Dec. 5, 1966, Ser. No. 598,981. Divided and this application July 19, 1968, Ser. No. 745,999
Int. Cl. A01n 9/12, 9/22; C07d 87/42
U.S. Cl. 71—88          15 Claims

ABSTRACT OF THE DISCLOSURE

A novel class of compounds including 2-(ω,ω-diethyleneoxyuramido)benzoic acid, its esters, phytotoxic salts, and the thio analogues thereof are provided. The compounds are useful as herbicides and are especially useful for controlling wild oats in the presence of desirable crops.

---

This application is a division of our copending application Ser. No. 598,981 filed Dec. 5, 1966, and now abandoned which in turn is a continuation-in-part of our application Ser. No. 524,452 filed Feb. 2, 1966, now abandoned.

This invention relates to novel uramidobenzoate compounds and herbicidal compositions and methods utilizing said uramidobenzoates.

According to the present invention there are provided novel compounds of the formula

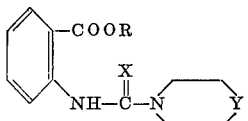

where R is selected from the group consisting of hydrogen, alkyl, alkenyl, alkynyl, aryl, alkali metal, amine and ammonium groups, and X and Y are selected from the group consisting of oxygen and sulfur. The organic groups represented by R can also have halogen substituents, such as chloro, bromo, and fluoro.

Thus, the invention provides, as novel compounds, 2-(ω,ω-diethyleneoxyuramido)benzoic acid and its thio analogues, the esters and phytotoxic salts thereof. Preferred esters are the lower alkyl, lower alkenyl, lower alkynyl groups of 1 to about 8 carbon atoms which can also have halogen substituents and the monocyclic aryl groups such as phenyl, alkylphenyl, and the halophenyl groups. Typical ester groups represented by R are methyl, ethyl, n-propyl, isopropyl, n-butyl, sec.-butyl, n-hexyl, allyl, 2-propynyl, 2-butenyl, 1-methyl - 2 - propenyl, 2-chloroethyl, 4 - chloro - 2 - butynyl, n-octyl, 2-chloro-2-propenyl, 4-bromo-2-butynyl, trifluoroethyl, trichloroethyl, phenyl, 2,4-dichlorophenyl, 4-methylphenyl, and the like. The phytotoxic salts are preferably the water-soluble alkali metal, amine and ammonium salts such as sodium, potassium, ammonium, octylamine, and triethylamine salts.

There are also provided by this invention novel herbicidal compositions and methods utilizing the uramidobenzoates to control weeds, especially wild oats.

The compounds of the present invention are normally crystalline solids or viscous oils which are soluble in organic solvents such as alcohols, benzene, and xylene. The salts are generally soluble in water. The compounds are readily prepared from the corresponding esters of anthranilic acid and morpholine by either of two methods.

According to one method of preparation, the anthranilate is converted to the corresponding isocyanate or isothiocyanate and then reacted with morpholine to give the desired compound. Alternatively, morpholine is converted to the carbamyl chloride derivative and then reacted with the anthranilate to give the desired compound. Thiomorpholine can also be used in the preparations to obtain the thio analogues.

The methods of preparation can be illustrated by the following equations in which X and Y have the significance previously assigned and R is an organic group, preferably lower alkyl.

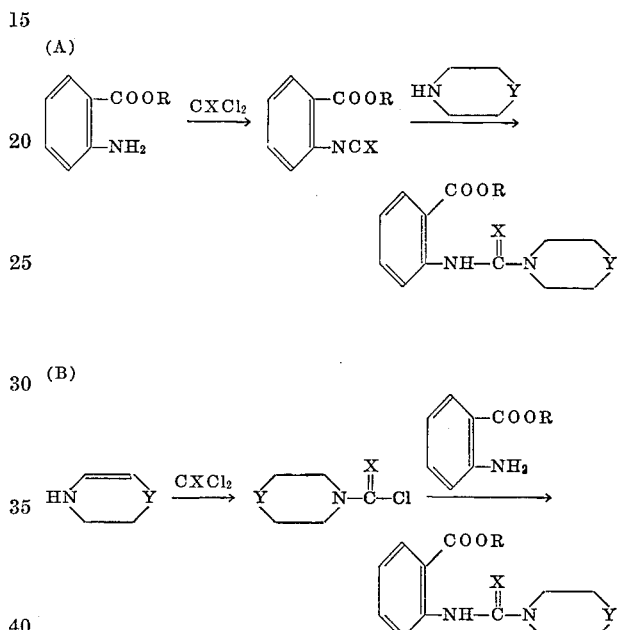

In the reaction illustrated by Equation A, the anthranilate, preferably as the hydrochloride, is reacted with phosgene or thiophosgene to give the isocyanate or isothiocyanate. This reaction takes place in a relatively high boiling solvent, such as chloroform, toluene, xylene, isooctane, or the like. The resultant isocyanate or isothiocyanate is isolated by distillation and then reacted with morpholine or thiomorpholine in the presence of an inert solvent, such as the hydrocarbons, to give the desired uramidobenzoate.

Referring now to Equation B, morpholine or thiomorpholine is reacted with phosgene or thiophosgene to give the carbamyl chloride which is then reacted with the anthranilate to provide the desired uramidobenzoate. Preferably, an inert solvent is employed as in the reactions illustrated by Equation A.

The desired uramidobenzoate is isolated and purified by conventional procedures such as by recrystallization from a suitable solvent as, for example, alcohol-water mixtures.

The corresponding uramidobenzoic acid can be prepared by hydrolysis of the ester such as with alcoholic sodium hydroxide which provides the corresponding sodium salt. The salt is then neutralized with an acid, such as hydrochloric acid, to provide the corresponding uramido benzoic acid. The acid forms salts with bases such as sodium hydroxide, potassium hydroxide, ammonium hydroxide and organic amines.

The higher esters can also be prepared by well-known transesterification procedures with the lower esters, especially the methyl ester.

The following examples are presented to illustrate the preparation of typical compounds of the invention but the invention is not to be considered restricted to the specific examples given.

EXAMPLE I

Methyl 2-isocyanatobenzoate

In a 5-liter, three-necked flask equipped with a gas inlet tube, stirrer and a reflux condenser connected to a water scrubber, was added 200 grams (1.32 moles) of methyl anthranilate dissolved in three liters of isooctane (commercial grade). Dry hydrogen chloride was passed into the isooctane solution of methyl anthranilate for 7 hours and a thick white precipitate was formed. The mixture was refluxed and phosgene was passed in at a rapid rate for 7 hours. The reaction mixture was then cooled and the insoluble precipitate was removed by filtration. The isooctane was removed at reduced pressure and the remaining residue was distilled to give 178.4 grams (76.2%) of product, B.P. 145°–146° C./16 mm.

Methyl 2-($\omega,\omega$-diethyleneoxyuramido)benzoate

A solution of 30.8 grams (0.353 mole) of morpholine in 10 ml. of benzene was added dropwise to a solution of 62.6 grams (0.353 mole) of methyl 2-isocyanatobenzoate in 200 ml. of benzene. The reaction mixture was refluxed for 1.25 hours and then concentrated under reduced pressure until the residue solidified. The solid product was suspended in a warm pentane-ether mixture, collected by filtration, washed with pentane and dried under vacuum. The product, 88.1 grams (94%), melted at 108°–109° C. After recrystallization from an ethanol-water mixture, the purified products melts at 110°–112° C.

*Analysis.*—Cal'd for $C_{13}H_{16}N_2O_4$ (percent): C, 59.08; H, 6.10; N, 10.60. Found (percent): C, 59.06; H, 6.15; N, 10.53.

EXAMPLE II

Ethyl 2-($\omega,\omega$-diethyleneoxyuramido)benzoate

Ethyl 2-isocyanatobenzoate (10.0 grams; 0.052 mole) was dissolved in 30 ml. of dry hexane with slight warming and 4.56 grams (0.052 mole) of morpholine was added slowly. The reaction was exothermic and the mixture was stirred for a few minutes after addition was completed. The solid product was removed by filtration and recrystallized from ethanol; M.P. 117°–119° C.; yield 10.8 grams (75%).

*Analysis.*—Calc'd for $C_{14}H_{18}N_2O_4$ (percent): C, 60.41; H, 6.51; N, 10.06. Found (percent): C, 60.32; H, 6.63; N, 10.14.

EXAMPLE III n-Propyl 2-($\omega,\omega$-diethyleneoxyuramido)benzoate

To a solution of 10.0 grams (0.0488 mole) of propyl 2-isocyanatobenzoate in 30 ml. of hexane was added slowly 4.3 grams (0.0495 mole) of morpholine. The reaction was exothermic and the mixture solidified. An additional 40 ml. of hexane was added and the mixture was then refluxed for 1 hour. The insoluble solid was collected by filtration, washed with pentane and then air dried; M.P. 94°–95° C.; yield 13.7 grams (96%).

*Analysis.*—Calc'd for $C_{15}H_{20}N_2O_4$ (percent): C, 61.63; H, 6.90; N, 9.58. Found (percent): C, 61.60; H, 6.92; N, 9.65.

EXAMPLE IV n-Butyl 2-($\omega,\omega$-diethyleneoxyuramido)benzoate

Morpholine (4.0 grams; 0.0457 mole) was added slowly to a solution of 10.0 grams (0.0457 mole) of butyl 2-isocyanatobenzoate in 30 ml. of hexane. The reaction was exothermic. The mixture was refluxed for 16 hours and the cloudy solution then cooled. The insoluble product was separated by filtration and washed with pentane. A total of 13.3 grams (95%) of product melting at 59.5°–66° C. was isolated. The pure product melted at 67°–67.5° C. after recrystallization from ethanol.

*Analysis.*—Calc'd for $C_{15}H_{22}N_2O_4$ (percent): C, 62.73; H, 7.24; N, 9.15. Found (percent): C, 62.92; H, 7.13; N, 9.10.

EXAMPLE V

2-($\omega,\omega$-diethyleneoxyuramido)benzoic acid

Methyl 2-($\omega,\omega$-diethyleneoxyuramido)benzoate (10.0 grams; 0.0378 mole) was refluxed for 3 hours in 50 ml. of 1 N alcoholic sodium hydroxide solution. The cooled solution was neutralized with hydrochloric acid and the precipitated solid was collected by filtration: M.P. 160°–160.5° C.; yield 4.9 grams (51%).

*Analysis.*—Calc'd for $C_{12}H_{14}N_2O_4$ (percent): C, 57.59; H, 5.64; N, 11.20. Found (percent): C, 57.59; H, 5.78; N, 11.16.

EXAMPLE VI

Methyl 2-isothiocyanatobenzoate

A solution of 15.1 grams (0.1 mole) of methyl anthranilate in 25 ml. of chloroform was added slowly to a solution of 13.6 grams (0.118 mole) of thiophosgene in 25 ml. of chloroform and the mixture was then refluxed for 4 hours. Chloroform and excess thiophosgene was removed by distillation and the residual liquid was distilled at 91°–92° C./0.15 mm. to give 16.8 grams (87%) of product.

Methyl 2-($\omega,\omega$-diethyleneoxythiouramido)benzoate

A solution of 2.2 grams (0.025 mole) of morpholine in 10 ml. of hexane was added to a stirred solution of 4.8 grams (0.025 mole) of methyl 2-isothiocyanatobenzoate in 30 ml. of hexane. The reaction mixture solidified immediately. The solid product was recrystallized from ethanol and melted at 106°–110° C. After recrystallization from hexane, the product melted at 116°–117.5° C.

*Analysis.*—Calc'd for $C_{13}H_{16}N_2O_3S$ (percent): C, 55.70; H, 5.75; N, 9.99. Found (percent): C, 55.84; H, 6.14; N, 9.63.

EXAMPLE VII

Morpholinylcarbonyl chloride

Phosgene (108 ml.) was added to one liter of stirred xylene at 0°–5° C. To this cold solution was slowly added a solution of 174.2 grams (2.0 moles) of morpholine in 200 ml. of xylene. The resultant mixture was stirred for one hour while cooled with an ice bath and then heated on a steam bath. The insoluble solid was separated by filtration and the filtrate was concentrated. The residual liquid was distilled at 124°–127° C./20 mm. to give 112.55 grams (75%) of product; $n_D$ 1.4985 (21° C.).

Sec.-butyl 2-($\omega,\omega$-diethyleneoxyuramido)benzoate

To a solution of 9.66 grams (0.05 mole) of sec.-butyl anthranilate and 3.96 grams (0.05 mole) of pyridine in 50 ml. of benzene was added a solution of 7.48 grams (0.05 mole) of morpholinylcarbonyl chloride in 50 ml. of benzene. The reaction mixture was refluxed for 30 hours, cooled and the insoluble solid was filtered. The benzene solution was washed with water, the organic layer dried over anhydrous magnesium sulfate and then concentrated to a viscous oil. The residual oil was distilled at 190° C./0.4 mm. and 1.5 grams of product was obtained; $n_D$ 1.5539 (20° C.).

*Analysis.*—Calculated for $C_{16}H_{22}N_2O_4$ (percent): C, 62.72; H, 7.23; N, 9.14. Found (percent): C, 63.00; H, 7.36; N, 9.16.

EXAMPLE VIII

Isopropyl 2-($\omega,\omega$-diethyleneoxyuramido)benzoate

A solution of 7.48 grams (0.05 mole) of morpholinylcarbonyl chloride in 50 ml. of benzene was added to a solution of 8.96 grams (0.05 mole) of isopropyl anthranilate and 3.96 grams (0.05 mole) of pyridine in 50 ml. of benzene. The mixture was refluxed for 30 hours and the benzene solvent was then removed by distillation under reduced pressure. The solid residue was dissolved in water and the insoluble oil was extracted with ethyl ether. The ethereal extract was dried over anhydrous magnesium sulfate and then concentrated under reduced pressure to an oil. The residual oil was distilled at 160°–165° C./0.1 mm. and 3.7 grams of amber-colored, viscous oil was obtained; $n_D$ 1.5535 (23° C.).

*Analysis.*—Calculated for $C_{15}H_{20}N_2O_4$ (percent): C, 61.62; H, 6.89; N, 9.58. Found (percent): C. 62.37; H, 6.95; N, 9.75.

EXAMPLE IX

Allyl 2-(ω,ω-diethyleneoxyuramido)benzoate

To 13.3 grams (0.05 mole) of methyl 2-(ω,ω-diethyleneoxyuramido)benzoate was added 150 ml. of dry allyl alcohol along with a catalytic amount of sodium metal. The mixture was stirred and heated and then the methanol was removed by distillation (up to 70° C.) using a two-foot fractionating column. The excess allyl alcohol was removed by distillation under vacuum and the residue recrystallized from methanol to give 7.5 grams (51%) of product, M.P. 77.5°–79° C.

EXAMPLE X

Methyl 2-(ω,ω-diethylenethiouramido)benzoate

A 200 ml. round-bottomed flask equipped with a reflux condenser and magnetic stirrer was charged with 2.00 grams (0.019 mole) of thiomorpholine (prepared by reduction of 3-thiomorpholineone with lithium aluminum hydride), 3.43 grams (0.019 mole) of methyl 2-isocyanatobenzoate and 50 ml. of benzene. The mixture was refluxed for 4 hours and the solvent was then evaporated on a Rinco evaporator. The solid residue was dissolved in a refluxing mixture of 30 ml. of hexane and 20 ml. of benzene. On cooling, the product crystallized giving 4.80 grams (88.4%) of a light tan solid; M.P. 121°–123.5° C. After recrystallization the product melts at 121.5°–122.5° C.

The following are among the many other compounds of the present invention which may be prepared according to the above-described procedures:

2-chloro-2-propenyl 2-(ω,ω-diethyleneoxyuramido) benzoate, M.P. 93°–94° C.

2-chloroethyl 2-(ω,ω-diethyleneoxyuramido)benzoate, M.P. 155.5°–156.5° C.

β,β,β-trifluoroethyl 2-(ω,ω-diethyleneoxyuramido) benzoate, M.P. 147.5°–148° C.

1-methyl-2-propenyl 2-(ω,ω-diethyleneoxyuramido) benzoate, M.P. 71°–74° C.

2-propynyl 2-(ω,ω-diethyleneoxyuramido)benzoate, M.P. 112.5°–113.5° C.

phenyl 2-(ω,ω-diethyleneoxyuramido)benzoate, M.P. 151.5°–152° C.

2-butenyl 2-(ω,ω-diethyleneoxyuramido)benzoate, M.P. 86°–87° C.

tert.-butyl 2-(ω,ω-diethyleneoxyuramido)benzoate, M.P. 112°–114° C.

n-hexyl 2-(ω,ω-diethyleneoxyuramido)benzoate, M.P. 58°–60° C.

isobutyl 2-(ω,ω-diethyleneoxyuramido)benzoate, M.P. 96.5°–97° C.

2,4-dichlorophenyl 2-(ω,ω-diethyleneoxyuramido) benzoate, M.P. 157°–161.5° C.

2,2,2-trichloroethyl 2-(ω,ω-diethyleneoxyuramido) benzoate, M.P. 161°–162° C.

2-chloroethyl 2-(ω,ω-diethylenethiouramido)benzoate, M.P. 100°–101° C.

allyl 2-(ω,ω-diethylenethiouramido)benzoate, M.P. 79.5°–81.5° C.

The uramidobenzoates of this invention are useful as herbicides and are especially useful for controlling wild oats (*Avena fatua*). Wild oats present a serious weed problem in crops such as barley, soybeans, wheat, sugar beets, flax, and safflower. Many of the compounds of this invention can be applied to wild oats infesting these crops and will kill or suppress the growth of the wild oats without serious injury to the crop plants. Compounds which are presently preferred for controlling wild oats in the presence of desirable crops are the esters of 2-(ω,ω-diethyleneoxyuramido)benzoic acid in which the ester group is a primary alkyl of 1 to about 3 carbon atoms. Thus, the presently preferred compounds are methyl 2-(ω,ω-diethyleneoxyuramido)benzoate, ethyl 2-(ω,ω-diethyleneoxyuramido)benzoate and n-propyl 2-(ω,ω-diethyleneoxyuramido)benzoate.

The compounds are effective for controlling weeds such as wild oats by application as either a pre-emergence or post-emergence treatment, that is, they can be used to kill or suppress the growth of growing plants or they can be used to prevent or suppress the emergence of seedling plants. Thus, the compounds can be used to control the growth of wild oats by applying an effective amount of uramidobenzoate to the locus of the wild oats, that is the foliage of the growing plants or soil in which the plants are growing or will grow.

An application rate in the range of from about 0.25 to about 25 lbs. of one or more of the active compounds per acre is generally an effective amount, although greater or lesser amounts can be used if desired. When used as a pre-emergence treatment, the presently preferred rate is in the range of from about 2 to about 20 lbs. per acre and when used as a post-emergence treatment a preferred application rate is in the range of from about 1 to about 15 lbs. per acre. Thus, a combined preferred rate for pre- and post-emergence treatments is in the range of from about 1 to about 20 pounds per acre. At the higher rates of application the wild oat plants are killed but at lower rates the growth of wild oats is suppressed, allowing the crop to overtake the weeds and effectively crowd them out.

Also it has been noted that at the lower rates, although the wild oat plants are not killed, the amount of seeds set by the plants is reduced substantially, therefore providing a substantial benefit to the farmer in that his cereal crop is not contaminated with undesirable wild oat seeds.

The following examples illustrate the use of typical compounds of this invention for killing wild oats.

EXAMPLE XI

Methyl 2-(ω,ω-diethyleneoxyuramido)benzoate was applied as both a pre-emergence and post-emergence treatment to greenhouse flats containing barley, soybeans, wheat, safflower, mustard, flax and wild oats. The compound was applied as a methanol-dioxane solution at a rate of 2 lbs. per acre pre-emergence and 4 lbs. per acre post-emergence. Forty-two days after treatment, the flats were examined for herbicidal activity. In both the pre- and post-emergence treated flats, the wild oats were killed completely with no noticeable damage to the crop plants.

EXAMPLE XII 2-(ω,ω-diethyleneoxyuramido)benzoic acid was applied in a methanol solution as a post-emergence treatment to a greenhouse flat containing rice, barley, peanuts, corn, soybeans and wild oats. At a rate of 2.5 lbs. per acre, substantially all wild oats were killed without damage to the soybeans, rice, barley, corn and peanuts.

EXAMPLES XIII–XIX

Greenhouse pots planted to wild oats and barley were sprayed with methanol-dioxane solutions of several uramidobenzoates of this invention. The compounds were sprayed onto the soil in the pots immediately after planting at a rate of 2.5 pounds of uramidobenzoate per acre. Thirty days after treatment, the pots were rated for herbicidal activity on a 0-10 basis in which 0=no effect;

6=stunting with some kill and 10=all plants dead. The following results were obtained:

| Compound | | Herbicidal rating | |
|---|---|---|---|
| | | Wild oats | Barley |
| XIII | n-Propyl 2-(ω,ω-diethyleneoxyuramido)benzoate. | 9 | 0 |
| XIV | Ethyl 2-(ω,ω-diethyleneoxyuramido)benzoate. | 9+ | 0 |
| XV | Methyl 2-(ω,ω-diethyleneoxythiouramido)benzoate. | 7 | 0 |
| XVI | Allyl 2-(ω,ω-diethyleneoxyuramido)benzoate. | 10 | 0 |
| XVII | Propynyl 2-(ω,ω-diethyleneoxyuramido)benzoate. | 9 | 0 |
| XVIII | 2-chloroethyl 2-(ω,ω-diethyleneoxyuramido)benzoate. | 8 | 0 |
| XIX | Phenyl 2-(ω,ω-diethyleneoxyuramido)benzoate. | 6 | 0 |

Since a relatively small amount of one or more of the active uramidobenzoates should be uniformly distributed over the area to be treated, the compounds preferably are formulated with conventional herbicide carriers, either liquid or solid. Thus, the compounds can be impregnated on or admixed with a pulverulent solid carrier such as lime, talc, clay, bentonite, calcium chloride, vermiculite, calcium carbonate, and the like. Alternatively, the compounds can be dissolved or suspended in a liquid carrier such as water, kerosene, alcohols, diesel oil, xylene, benzene, glycols, and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salt of naphthalenesulfonic acid, alkylaryl polyether alcohols, long chain quaternary ammonium compounds, sodium salts of petroleum-derived alkylsulfonic acids, polyoxyethylenesorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99 percent by weight of one or more of the active uramidobenzoates with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also other herbicides, such as the chlorophenoxyacetic acids and haloalkanoic acids can be included in the formulation.

The following examples are presented to illustrate the preparation of suitable herbicidal compositions of this invention.

EXAMPLE XX

Percent
Methyl 2 - (ω,ω - diethyleneoxyuramido)benzoate (powdered) _____ 5
Granular clay _____ 95

A granular formulation can be prepared by dry blending the above constituents until uniformly mixed in a rotary mixer. A fine spray of water is sprayed onto the mixture, while tumbling to adhere the compound to the clay. The material is then air dried while tumbling to give a granular formulation which can be applied to the soil or vegetation by hand or by a mechanical spreader.

EXAMPLE XXI

Percent
n-Butyl 2-(ω,ω-diethyleneoxyuramido)benzoate _____ 85
Bentonite clay _____ 14
Sodium lauryl sulfate surfactant _____ 1

A wettable powder formulation can be prepared by micronizing the uramidobenzoate and mixing uniformly with powdered bentonite clay and powdered sodium lauryl sulfate. The wettable powder can be added to water or hydrocarbon oil and mechanically agitated to insure a uniform dispersion which can be sprayed with conventional equipment on soil or vegetation.

EXAMPLE XXII

Percent
Ethyl 2-(ω,ω-diethyleneoxyuramido)benzoate _____ 15
Polyoxyethylenesorbitan monolaurate _____ 2
Isopropanol _____ 30
Xylene _____ 53

The uramidobenzoate is dissolved in a mixture of isopropanol and xylene to form a concentrated solution. The emulsifying agent is then dissolved and a liquid formulation of an emulsifiable concentrate is obtained. The emulsifiable concentrate can be added to water to dilute to a desired concentration, and then be sprayed with conventional equipment on soil or vegetation.

EXAMPLE XXIII

Percent
2-(ω,ω-diethyleneoxyuramido)benzoic acid, sodium salt _____ 4
Polyoxyethylene sorbitan monolaurate _____ 1
Water _____ 95

A solution of the uramidobenzoate is prepared by dissolving the sodium salt in water containing a small amount of the surfactant.

What is claimed is:

1. A herbicidal composition comprising a pulverulent solid carrier, a surfactant, and a herbicidally effective amount of a compound of the formula

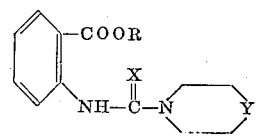

where R is selected from the group consisting of lower alkyl, lower alkenyl, lower alkynyl, and the halo derivatives thereof, phenyl, halophenyl, lower alkylphenyl, alkali metal, lower alkylamine and ammonium groups, and X and Y are selected from the group consisting of oxygen and sulfur.

2. A composition according to claim 1 in which said compound is n-propyl 2-(ω,ω-diethyleneoxyuramido)benzoate.

3. A composition according to claim 1 in which said compound is methyl 2-(ω,ω-diethyleneoxyuramido)benzoate.

4. A composition according to claim 1 in which said compound is ethyl 2-(ω,ω-diethyleneoxyuramido)benzoate.

5. The method for controlling weed growth which comprises applying to the locus of said weeds a herbicidally effective amount of a compound of the formula

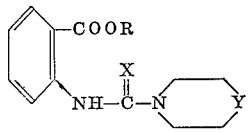

where R is selected from the group consisting of hydrogen, lower alkyl, lower alkenyl, lower alkynyl, and the halo derivatives thereof, phenyl, halophenyl, lower alkylphenyl, alkali metal, lower alkylamine and ammonium groups, and X and Y are selected from the group consisting of oxyen and sulfur.

6. The method according to claim 5 in which from about 1 to about 20 pounds of said compound are applied per acre.

7. The method according to claim 5 wherein said compound is applied to the soil.

8. The method according to claim 5 wherein said weed growth is wild oats and R is a primary alkyl group of 1 to about 3 carbon atoms and X and Y are oxygen.

9. The method according to claim 8 wherein said compound is applied to wild oat plants.

10. The method according to claim 5 in which said R is lower alkyl and X and Y are oxygen.

11. The method according to claim 5 in which said R is lower alkenyl and X and Y are oxygen.

12. The method according to claim 5 in which said compound is methyl 2-($\omega,\omega$-diethyleneoxyuramido)benzoate.

13. The method according to claim 5 in which said compound is ethyl 2-($\omega,\omega$-diethyleneoxyuramido)benzoate.

14. The method according to claim 5 in which said compound is n-propyl 2-($\omega,\omega$-diethyleneoxyuramido)benzoate.

15. The method for controlling wild oats in the presence of wheat and barley which comprises applying to the locus of said wild oats a herbicidally effective amount of methyl 2-($\omega,\omega$-diethyleneoxyuramido)benzoate.

References Cited

UNITED STATES PATENTS

| 2,913,322 | 11/1959 | Beaver et al. | 71—88 |
| 3,158,461 | 11/1964 | Weil | 71—87 |
| 3,232,736 | 2/1966 | Seefelder et al. | 71—88 |

FOREIGN PATENTS

| 1,379,935 | 10/1963 | France. |

OTHER REFERENCES

Epstein et al., J. Am. Chem. Soc. 79, 5814–5817 (1957).

Staiger et al., J. Org. Chem. 18, 1427–1439 (1953).

ELBERT L. ROBERTS, Primary Examiner

M. KASSENOTT, Assistant Examiner

U.S. Cl. X.R.

71—90; 260—243, 247.1, 247.2

UNITED STATES PATENT OFFICE
CERTIFICATE OF CORRECTION

Patent No. 3,503,731        Dated March 31, 1970

Inventor(s) Don L. Hunter, et al.

It is certified that error appears in the above-identified patent and that said Letters Patent are hereby corrected as shown below:

In Column 2, line 35, the compound appearing as

should read as follows:

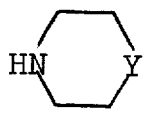

Signed and sealed this 16th day of May 1972.

(SEAL)
Attest:

EDWARD M. FLETCHER, JR.
Attesting Officer

ROBERT GOTTSCHALK
Commissioner of Patents